United States Patent
Yang

(10) Patent No.: US 12,532,171 B2
(45) Date of Patent: Jan. 20, 2026

(54) NETWORK EQUIPMENT AND USER EQUIPMENT

(71) Applicant: InterDigital Patent Holdings, Inc., Wilmington, DE (US)

(72) Inventor: Haorui Yang, Dongguan (CN)

(73) Assignee: InterDigital Patent Holdings, Inc., Wilmington, DE (US)

( * ) Notice: Subject to any disclaimer, the term of this patent is extended or adjusted under 35 U.S.C. 154(b) by 336 days.

(21) Appl. No.: 18/378,830

(22) Filed: Oct. 11, 2023

(65) Prior Publication Data

US 2024/0056807 A1  Feb. 15, 2024

Related U.S. Application Data

(63) Continuation of application No. PCT/CN2021/087685, filed on Apr. 16, 2021.

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0892* (2013.01); *H04W 48/18* (2013.01); *H04W 84/042* (2013.01)

(58) Field of Classification Search
CPC ................ H04W 12/06; H04W 48/18; H04W 84/042; H04L 63/0892; Y02D 30/70
(Continued)

(56) References Cited

U.S. PATENT DOCUMENTS 10,904,731 B2  1/2021 Breuer
2018/0368061 A1  12/2018 Yu
(Continued)

FOREIGN PATENT DOCUMENTS

CN  109417687 A  3/2019
CN  109699031 A  4/2019
(Continued)

OTHER PUBLICATIONS

Supplementary European Search Report in the European application No. 21936450.2, mailed on Apr. 29, 2024. 10 pages.
(Continued)

*Primary Examiner* — Huy C Ho
(74) *Attorney, Agent, or Firm* — Volpe Koenig

(57) ABSTRACT

A network device and user equipment (UE) are provided. The network device includes a memory, a transceiver, a processor, and a bus system, the processor is configured to execute the instructions in the memory to perform operations of: in response to receiving an authentication request, sending a first authentication message to a first UE, the authentication request being used to trigger an authentication flow for a second UE requesting to use a target network slice, the second UE accessing the first network equipment through the first UE, the first authentication message comprising a first indication and a first extensible authentication protocol (EAP) message, the first indication indicating that the first EAP message is to be used by the second UE, the first EAP message being used to authenticate legality of use of the target network slice by the second UE.

20 Claims, 7 Drawing Sheets

(51) Int. Cl.
*H04W 48/18* (2009.01)
*H04W 84/04* (2009.01)

(58) Field of Classification Search
USPC .......................................................... 455/411
See application file for complete search history.

(56) References Cited

U.S. PATENT DOCUMENTS

| | | | |
|---|---|---|---|
| 2019/0335330 A1* | 10/2019 | Salkintzis | ............. H04W 12/72 |
| 2020/0053083 A1 | 2/2020 | Kunz | |
| 2020/0107173 A1 | 4/2020 | Breuer | |
| 2021/0058833 A1* | 2/2021 | Basu Mallick | ....... H04L 69/321 |
| 2022/0159460 A1* | 5/2022 | Ben Henda | ......... H04W 12/084 |

FOREIGN PATENT DOCUMENTS

| | | |
|---|---|---|
| CN | 108924883 B | 7/2020 |
| CN | 112291784 A | 1/2021 |
| CN | 112512096 A | 3/2021 |
| WO | 2020035732 A1 | 2/2020 |

OTHER PUBLICATIONS

"3 Generation Partnership Project; Technical Specification Group Services and System Aspects; Security architecture and procedures for 5G system (Release 17)", 3GPP Standard; Technical Specification; 3GPP TS 33.501, 3rd Generation Partnership Proet (PP), Moile Competence Centre; 650, Route Des Lucioles; F-06921 Sophia-Antipolis Cedex; France, vol. SA WG3, No. v17.0.0 Dec. 16, 2020 (Dec. 16, 2020), pp. 1-253, XP051999377, clause 16.3; p. 187-p. 189, figures 16.3-1. 253 pages.
China Mobile et al, "Remote provisioning of credentials for NSSAA or secondary authentication/authorisation", 3GPP TSG-SA WG2 Meeting #144-e S2-2102263, E-Meeting, Apr. 12-Apr. 16, 2021, section 5.15.10, and section 5.X. 6 pages.
International Search Report in the international application No. PCT/CN2021/087685, mailed on Dec. 23, 2021. 5 pages with English translation.
Written Opinion of the International Search Authority in the international application No. PCT/CN2021/087685, mailed on Dec. 23, 2021. 8 pages with English translation.
"3rd Generation Partnership Project; Technical Specification Group Services and System Aspects; Study on security aspects of enhancement for proximity based services in the 5G System (5GS) (Release 17)", 3GPP TR 33.847 V0.5.0 (Mar. 2021), pp. 42-64. 120 pages.

* cited by examiner

NETWORK EQUIPMENT AND USER EQUIPMENT

CROSS-REFERENCE TO RELATED APPLICATION

This application is a continuation of International Patent Application No. PCT/CN2021/087685 filed on Apr. 16, 2021, which is hereby incorporated by reference in its entirety.

BACKGROUND

In a network of the 5th generation mobile communication technology (5G), there are rich and diverse network services, and the network has to meet different requirements of different network services. For example, for a network service such as self-driving, remote control, etc., the network has to be highly reliable and of an ultra-low delay. For a network service such as augmented reality (AR)/virtual reality (VR), etc., the network has to be of an ultra-high bandwidth. For a network service such as an internet of things (IOT), etc., the network has to support massive equipment access and ultra-low power consumption. Therefore, to meet demands of different network services, the network may be divided into multiple network slices, with different network slices being used to implement different network services.

When a user equipment (UE) is to use a network slice, a network slice-specific authentication and authorization (NS-SAA) flow further has to be performed on the network slice, to determine whether use of the network slice by the UE is allowed.

With development of communication technology, in advancing a communication standard, the communication architecture of UE-to-network relay is introduced in a release 17 (R17). That is, a remote user equipment (RM UE) may implement data transmission between the RM UE and a network by accessing the network through a relay UE (RL UE). However, so far there is no clear method for performing a NSSAA flow on a network slice to be used by a RM UE.

SUMMARY

Embodiments of the disclosure provide a network equipment and user equipment.

In a first aspect, there is provided a network equipment, comprising a memory, a transceiver, a processor, and a bus system, wherein the memory is configured to store instructions, wherein the transceiver is configured to receive or send information as controlled by the processor, wherein the processor is configured to execute the instructions in the memory, wherein the bus system is configured to connect the memory, the transceiver, and the processor to allow communication among the memory, the transceiver, and the processor, wherein the processor is configured to call the instructions in the memory to implement operations of: in response to receiving an authentication request, sending a first authentication message to a first user equipment (UE), the authentication request being used to trigger an authentication flow for a second user equipment (UE) requesting to use a target network slice, the second UE accessing the first network equipment through the first UE, the first authentication message comprising a first indication and a first extensible authentication protocol (EAP) message, the first indication indicating that the first EAP message is to be used by the second UE, the first EAP message being used to authenticate legality of use of the target network slice by the second UE.

In a second aspect, there is provided a first user equipment (UE), comprising a memory, a transceiver, a processor, and a bus system, wherein the memory is configured to store instructions, wherein the transceiver is configured to receive or send information as controlled by the processor, wherein the processor is configured to execute the instructions in the memory, wherein the bus system is configured to connect the memory, the transceiver, and the processor to allow communication among the memory, the transceiver, and the processor, wherein the processor is configured to call the instructions in the memory to implement operations of: receiving a first authentication message sent by a first network equipment, the first authentication message comprising a first indication and a first extensible authentication protocol (EAP) message, the first indication indicating that the first EAP message is to be used by a second UE, the first EAP message being used to authenticate legality of use of a target network slice by the second UE; and sending the first EAP message to the second UE, wherein the second UE accesses the first network equipment through the first UE.

In a third aspect, there is provided a second user equipment (UE), comprising a memory, a transceiver, a processor, and a bus system, wherein the memory is configured to store a program and an instruction, wherein the transceiver is configured to receive or send information as controlled by the processor, wherein the processor is configured to execute the program in the memory, wherein the bus system is configured to connect the memory, the transceiver, and the processor to allow communication among the memory, the transceiver, and the processor, wherein the processor is configured to call the instructions in the memory to implement an operation of: receiving a first extensible authentication protocol (EAP) message sent by a first UE, the first EAP message being used to authenticate legality of a target network slice requested to be used by the second UE, the second UE accessing a first network equipment through the first UE.

DETAILED DESCRIPTION

To clearly show a technical problem to be solved, a technical solution, and beneficial effects of the disclosure, implementation of the disclosure is further elaborated below with reference to the drawings. The drawings herein are just for reference and explanation, and are not intended to limit embodiments of the disclosure.

Note that a term "first", "second", etc., in the specification, the claims, and the drawings of the disclosure is for differentiating different objects, instead of denoting any specific order. In addition, a term such as "including/comprising", "having", or any other variant of the term is intended to cover a non-exclusive inclusion. For example, a process, method, system, product, or device/equipment including a series of steps or units is not limited to a step or unit explicitly listed, but may include another step or unit not explicitly listed or that is implicit in such a process, method, product, or device/equipment.

Figure 1:
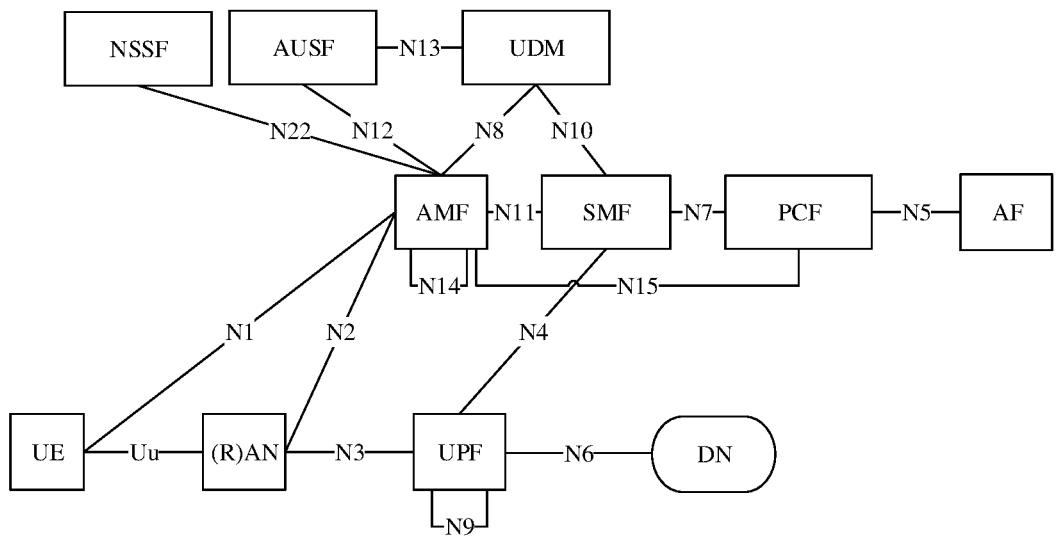
FIG. 1 is a diagram of architecture of a system according to an embodiment of the disclosure.

FIG. 1 shows illustratively a diagram of system architecture according to the disclosure. As shown in FIG. 1, the system architecture includes an access and mobility management function (AMF) network element, a session management function (SMF) network element, a policy control function (PCF) network element, an authentication server function (AUSF) network element, a unified data management (UDM) network element, an application function (AF) network element, a user plane function (UPF) network element, and a network slice selection function (NSSF) network element. Further, the communication system architecture may further include a wireless access network (RAN) equipment, a user equipment (UE), and a data network (DN) network element.

An AMF network element is mainly configured for registration of a UE in a mobile network, mobility management, and tracking area update. A mobility management network element may receive a non access stratum (NAS) message, implement registration management, connection management, and accessibility management, allocate a tracking area list, perform mobility management, etc., and transparently route a session management message to the SMF network element.

An SMF network element is mainly used to manage a session in a mobile network, such as creation, modification, release, etc., of a session. For example, a specific function of the SMF network element may include allocating an internet protocol (IP) address to a user, selecting a user plane network element that provides the function of message forwarding, etc.

In addition, a PCF network element may include user contract data management, PCF, accounting PCF, quality of service (QoS) control, etc. An AUSF network element is mainly used to implement user authentication by providing an authentication service function using an extensible authentication protocol (EAP) and storing a key. A UDM network element is mainly used to store user data such as contract information, authentication/authorization information, etc.

A UPF network element is mainly configured for user plane service processing, such as service routing, packet forwarding, anchoring, quality of service (QoS) mapping and implementation, uplink identification and route to a DN, downlink packet cache and downlink data arrival notification trigger, and connection to an external DN, etc. A NSSF network element is mainly used to select a network slice serving a UE, determine network slice selection assistance information (NSSAI) configured for a UE, and determine NSSAI allowed by a UE.

An RAN equipment may be an equipment providing a UE with wireless communication. An access network equipment may include, but is not limited to, a next generation Node B (gNodeB, gNB) in 5G, an evolved Node B (eNB), a radio network controller (RNC), a Node B (NB), a base station controller (BSC), a base transceiver station (BTS), a home NB, a base band unit (BBU), a transmitting and receiving point (TRP), a transmitting point (TP), a mobile switching center, etc.

A UE in embodiments of the disclosure may be an equipment capable of wireless transceiving. The UE may be deployed on land, such as indoor or outdoor, handheld or onboard; on water; and may also be airborne such as onboard an aircraft, a balloon, a satellite, etc. The UE may be a mobile phone, a pad, a computer with a wireless transceiving function, a virtual reality (VR) equipment, an augmented reality (AR) equipment, a wireless equipment in self driving, a wireless equipment in remote medical, an equipment in a smart grid, a wireless equipment in transportation safety, a wireless equipment in a smart city, etc.

A DN network element is mainly used to provide a user with a service, such as a service of an operator, an internet access service, and a third-party service.

Understandably, a network element mentioned here may be a network element in a hardware equipment, and may also be a software function executed on specific hardware, or may be an instantiated virtual function on a platform (such as a cloud platform). The network element may be divided into one or more services. Further, there may also be a service separate from a network function.

Referring to FIG. 1, the UE may be connected to the AMF network element through a port N1. The RAN equipment may be connected to the AMF network element through a port N2. The UE may be connected to the RAN equipment through a port Uu. N3 may be a connection between the RAN equipment and the UPF network element. N4 may be a connection port between the SMF network element and the UPF, and may be used to deliver control signaling between the SMF network element and the UPF network element. N5 may be a connection port between the PCF network element and the AF network element. N6 may be a connection port between the UPF network element and the DN network element. N7 may be a connection port between the SMF network element and the PCF network element. N8 may be a connection port between the AMF network element and the UDM network element. N10 may be a connection port between the UDM network element and the SMF network element. N11 may be a connection port between the AMF network element and the SMF network element. N12 may be a connection port between the AUSF network element and the AMF network element. N15 may be a connection port between the AMF network element and the PCF network element. N22 may be a connection port between the NSSF network element and the AMF network element.

With development of technology, a future communication network must be accessed by a large number of UE. These UE belong to different fields, and have different characteristics and demands. Therefore, the conception of a network slice is introduced in the 5G architecture. A network slice may be customized for different services to implement network resource dedication and isolation, providing a better service while meeting demands of different service scenes.

Specifically, when a UE requests to access a network slice, the UE may provide requested NSSAI to a core network. The core network may perform comprehensive determination according to information such as contract data of the UE, a roaming agreement, a local configuration, etc., and return allowed NSSAI allowed by the current network to the UE. Having received the allowed NSSAI, the UE may establish a packet data unit (PDU) session in a network slice provided by the allowed NSSAI to transmit data.

In R16, secondary authentication of a network slice is introduced. That is, in registering a UE in a network, in addition to performing primary authentication on a permanent ID of the UE, it may further be determined whether to perform NSSAA on a requested network slice according to the network slice requested by the UE, as well as the contract data of the UE. This flow may also be referred to simply as secondary authentication of a network slice, or as second authentication in short.

In an actual application, in case NSSAA is to be performed on a network slice requested by a UE, the network may trigger a NSSAA flow. If authentication of the network slice succeeds, the network slice may be used by the UE, and single-network slice selection assistance information (S-NSSAI) corresponding to the network slice may be added to the allowed NSSAI. If authentication of the network slice fails, the network slice may not be used by the UE, and the S-NSSAI corresponding to the network slice may be added to rejected NSSAI.

Figure 2:
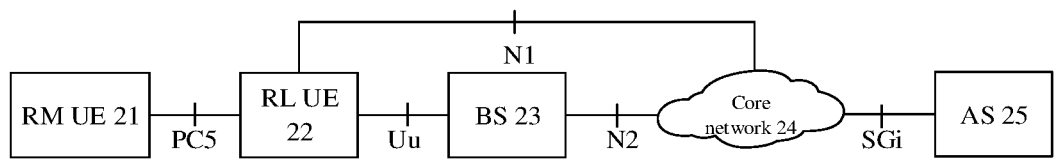
FIG. 2 is a diagram of architecture of UE-to-network relay according to an embodiment of the disclosure.

With constant evolvement of communication technology, UE-to-network relay architecture 200 is introduced in R17. Referring to FIG. 2, the UE-to-network relay architecture 200 may include a RM UE 21, a RL UE 22, a NB 23, a core network 24, and a public secure application server (AS) 25. The RL UE 22 may be connected to the NB 23 through a port Uu. Here, the port Uu may be a data transmission port between the UE and the NB, and is mainly used to implement radio resource control (RRC) connection processing, switch and power control ruling, paging broadcast by the NB, etc. In addition, the RL UE 22 may further communicate with the core network 24 through a port N1. Meanwhile, the NB 23 may access the core network 24 through a port N2. Specifically, corresponding to FIG. 1, the RL UE 22 may communicate with an AMF network element in the core network 24 through the port N1 to transmit NAS data.

Understandably, the RL UE 22 may be within coverage of the NB 23. The RM UE 21 may be beyond coverage of the NB 23. The RM UE 21 may not be connected direct to the NB 23, and instead be connected direct to the RL UE 22 through a port PC5, and access the core network 24 through the RL UE 22. The port PC5 may be an inter-UE data transmission port. An adjacent UE may establish a direct link within a close range through the port PC5, and perform data transmission through the direct link. The NB may be connected to the AS 25 through a port SGi. The port SGi may be used to be connected to an external internet and transmit user plane data.

The core network 24 may provide the RM UE 21 and the RL UE 22 with a communication connection, authentication, management, communication, data service bearing, etc. Corresponding to the network architecture as shown in FIG. 1, the core network may include a UPF and a control plane function. The UPF is mainly in charge of packet forwarding, QoS control, etc. The control plane function is mainly in charge of user registration authentication, mobility management, sending a data packet forwarding policy, a QoS control policy, etc., to the UPF network element. The control plane function mainly includes the AMF network element, the SMF network element, etc.

In architecture 200, the RM UE 21 may access the network through the RL UE 22 and implement data transmission. If NSSAA is to be performed on the network slice requested by the UE, although an existing NSSAA process may be used for the RL UE 22, it remains unclear whether use of the network slice by the RM UE 21 is authenticated.

Accordingly, embodiments of the disclosure provide a method for network slice authentication, capable of improving a network slice authentication solution in related art.

Figure 3:
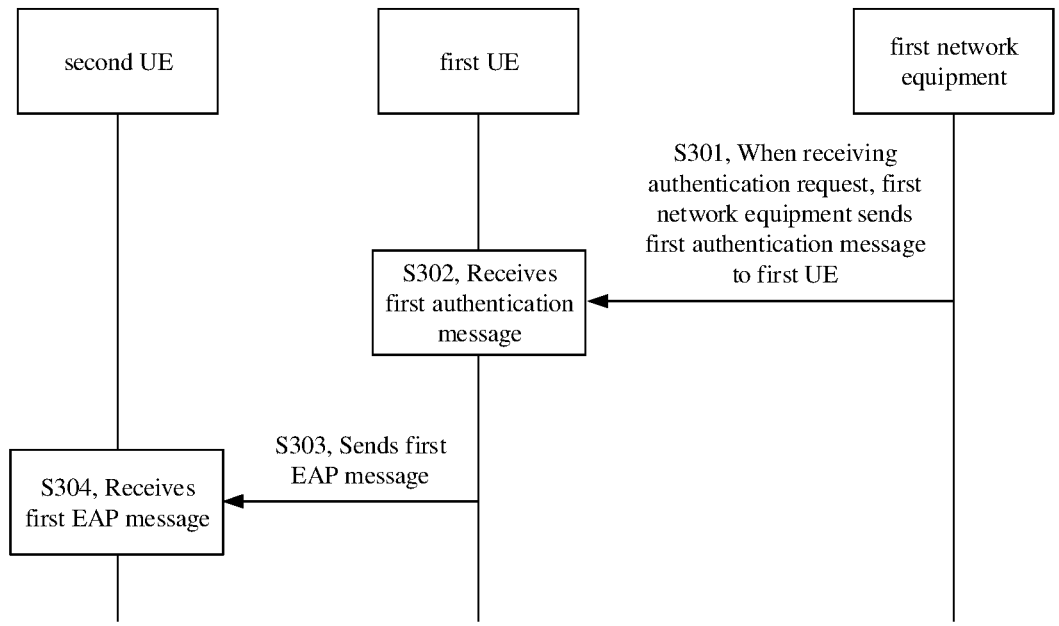
FIG. 3 is a first flowchart of a method for network slice authentication according to an embodiment of the disclosure.

FIG. 3 is a flowchart of a method for network slice authentication according to an embodiment of the disclosure. As shown in FIG. 3, the method for network slice authentication according to the embodiment of the disclosure may include S301 to S304.

At S301, in response to receiving an authentication request, a first network equipment sends a first authentication message to a first user equipment (UE).

The first authentication message includes a first indication and a first extensible authentication protocol (EAP) message. The first indication indicates that the first EAP message is used to be used by the second UE.

At S302, the first UE receives the first authentication message sent by the first network equipment.

At S303, the first UE sends the first EAP message to the second UE.

At S304, the second UE receives the first EAP message sent by the first UE.

The first network equipment may be the AMF network element in the core network, and may be configured to perform network registration, mobility management, tracking area update, UE paging, etc., on the first UE and the second UE.

In some embodiments, the second UE accesses the first network equipment through the first UE. That is, the first UE may provide a relay service for the second UE and the first network equipment and forward data for the second UE and the first network equipment. Understandably, the first UE may be the RL UE 22 in the UE-to-network relay architecture 200 as shown in FIG. 2. The second UE may be the RM UE 21 in the UE-to-network relay architecture 200.

In some embodiments, the second UE may determine a target network slice to be used according to a current service. If NSSAA is to be performed on the target network slice, the second UE may trigger a flow of authentication of the target network slice.

Specifically, the second UE may send an authentication request. The authentication request may be used to trigger an authentication flow for the second UE requesting to use the target network slice. That is, the second UE may trigger, through the authentication request, a flow of authentication performed by the network side on the target network slice requested to be used.

In some embodiments, the second UE may send an authentication request to the first UE, such that the first UE may forward the authentication request to the first network equipment, thereby triggering the flow of authentication of the target network slice by the network side.

Specifically, the second UE may send an authentication request to the first UE through a port PC5. Accordingly, the first UE may send the authentication request to the first network equipment through a port N1. Alternatively, the first UE may also send the authentication request to the NB through a port Uu. Then, the NB may send the authentication request to the first network equipment through a port N2.

In some embodiments, the second UE may instruct, through an application stratum, a first authentication authorization accounting-server (AAA-S) to authenticate the target network slice to be used. The first AAA-S may be the home AAA-S of the second UE. Accordingly, the home AAA-S of the second UE may send an authentication request to the first network equipment to trigger the flow of authentication of the target network slice by the network side.

Note that the system architecture as shown in FIG. 1 may further include a NSSAA function (NSSAAF) network element. The first AAA-S may be connected to the NSSAAF network element, and send the authentication request to the first network equipment through the NSSAAF network element.

As the first AAA-S may be a server provided by a third party, the network side may further authenticate whether data transmitted by the first AAA-S are credible data through an authentication authorization accounting-proxy (AAA-P) network element. The AAA-P network element may be provided in between the first AAA-S and the NSSAAF network element, and may be used to verify the data sent by the first AAA-S. Understandably, the first AAA-S may send the authentication request to the AAA-P network element. If the authentication request is verified by the AAA-P network element, the AAA-P network element may forward the authentication request to the first network equipment in the core network through NSSAA.

In some embodiments, authentication may have to be performed periodically on a target network slice to ensure safety of the target network slice. Accordingly, the first AAA-S may proactively send the authentication request to the first network equipment cyclically to trigger the flow of authentication of the target network slice.

That is, the authentication request received by the first network equipment may be sent by the first UE, or by the first AAA-S.

In embodiments of the disclosure, the authentication request may include at least one of an identification (ID) of the second UE, single-network slice selection assistance information (S-NSSAI) corresponding to the target network slice, or an HPLMN ID of the second UE.

Here, the ID of the second UE may be one of an international mobile subscriber identity (IMSI), a globally unique temporary UE identity (GUTI), as well as a global positioning system identity (GPSI).

Note that the IMSI may also carry the HPLMN ID of the second UE, while the GUTI and the GPSI may not contain the HPLMN ID of the second UE. Therefore, when the IMSI is used, the HPLMN ID of the second UE does not have to be carried in the authentication request separately.

Understandably, the first network equipment may start the flow of authenticating the target network slice requested by the second UE based on an authentication request received. Here, the authentication flow started by the first network may be an EAP-protected extensible authentication protocol (EAP-PEAP) authentication flow, an EAP-message digest 5 (EAP-MD5) authentication flow, or an EAP-transport level security (EAP-TLS) authentication flow, which is not limited in embodiments of the disclosure.

Accordingly, having started the flow of authenticating the target network slice requested by the second UE, the first network equipment may send a first authentication message to the first UE.

In some embodiments, the first authentication message includes a first indication and a first extensible authentication protocol (EAP) message. The first EAP message is used to authenticate legality of use of the target network slice by the second UE. The first indication indicates that the first EAP message is used to be used by the second UE.

That is, the first indication may indicate that the first EAP message is for the second UE. Thus, having received the first authentication message, the first UE may parse the first authentication message, acquiring the first indication and the first EAP message. Further, the first UE may send the first EAP message to the second UE according to the first indication in the first authentication message.

In some embodiments, the first indication may include the ID of the second UE and/or the S-NSSAI of the target network slice. That is, the first network equipment may indicate, using the ID of the second UE and/or the S-NSSAI of the target network slice, that the first EAP message is for the second UE. The ID of the second UE is as described in an embodiment presented above, which is not repeated here.

In some embodiments, the first EAP message may include information about authentication of the second UE requesting to use the target network slice. Illustratively, the first EAP message may include an encryption algorithm, certificate information of the first AAA-S(including information on a public key and on a name of the first AAA-S), random encryption information, etc.

Thus, having received the first EAP message, the second UE may authenticate the target network slice based on the information about authentication in the first EAP message.

Thus, with a method for network slice authentication according to embodiments of the disclosure, the first network equipment may inform the first UE through the first indication that the first EAP message is for the second UE. Thus, the first UE may forward the first EAP message to the second UE, implementing authentication of the target network slice requested by the second UE, guaranteeing safety of the network slice, improving a network slice authentication solution in related art.

Note that a target network slice in embodiments of the disclosure is a network slice on which NSSAA is to be performed. In an actual application, a network slice on which NSSAA is to be performed may generally be deployed where the UE belongs, and bind to the HPLMN of the UE. That is, authentication of the target network slice is to be performed through the home NSSAAF network element of the second UE and/or the home AAA-S of the second UE.

However, as the second UE performs relayed communication relayed through the first UE, and transmits data using a resource of the first UE, the HPLMN of the second UE and the HPLMN of the first UE have to be one HPLMN to authenticate the target network slice requested to be used by the second UE. Accordingly, the second UE may authenticate the target network slice using the home AAA-S and/or the home NSSAAF of the first UE.

Figure 4:
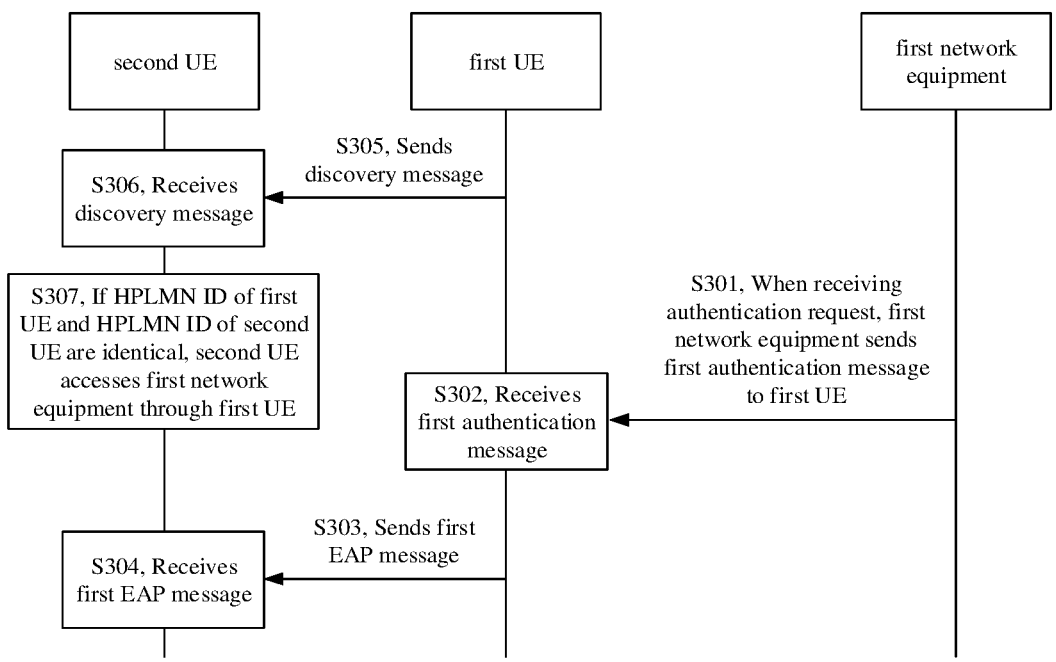
FIG. 4 is a second flowchart of a method for network slice authentication according to an embodiment of the disclosure.

In some embodiments, with reference to the flow chart in FIG. 4, operations S305 to S307 may be performed before S301.

At S305, the first UE may send a discovery message. The discovery message may include a home public land mobile network (HPLMN) identification (ID) of the first UE.

At S306, the second UE may receive the discovery message sent by the first UE.

At S307, if the HPLMN ID of the first UE and an HPLMN ID of the second UE are identical, the second UE may access the first network equipment through the first UE. The first network equipment may refer to a network equipment that is serving the first UE.

In some embodiments, to initiate near-field communication, the first UE may broadcast a discovery message. The discovery message may carry the HPLMN ID of the first UE, to tell a UE around that the first UE may provide a relay service.

In an example, the second UE may not be covered by any network, or may be a low-cost and/or low-bandwidth UE that has no direct access to a network.

The second UE may be adjacent to the first UE. The second UE may receive a discovery message sent by the first UE. Further, the second UE may determine a target network slice to be used according to a current service. If NSSAA is to be performed on the target network slice, the second UE may determine whether the HPLMN of the first UE and the HPLMN of the second UE are the same according to the HPLMN ID of the first UE carried in the discovery message.

In some embodiments, the second UE may also proactively initiate near-field communication. Specifically, to perform data transmission using a target network slice, the second UE may proactively broadcast, before S305, a discovery request, to request a UE around the second UE to provide a relay service. The discovery request may include the HPLMN of the second UE and/or the S-NSSAI of the requested target network slice.

Further, having received the discovery request of the second UE, the first UE may return a discovery response (i.e., the discovery message at S305) to the second UE based on the discovery request. The discovery response may carry the HPLMN ID of the first UE. Thus, having received the discovery message sent by the first UE, the second UE may determine whether the HPLMN of the first UE and the HPLMN of the second UE are the same according to the discovery message sent by the first UE.

In embodiments of the disclosure, in case the HPLMN of the first UE and the HPLMN of the second UE are the same, the second UE may select the first UE, and establish a near-field communication connection with the first UE. The second UE may access the first network equipment through the first UE to perform authentication on the requested target network slice.

The second UE selects a first UE of a HPLMN same as that of the second UE to authenticate the target network slice, because a target network slice on which NSSAA is to be performed may bind to a home operator of the second UE. Therefore, the target network slice may not be authenticated and used unless the HPLMN ID of the first UE and the HPLMN ID of the second UE are the same.

In some embodiments, the discovery message may also carry the NSSAI supported by the first UE, or a relay service code (RSC) corresponding to each S-NSSAI in the NSSAI. Here, the NSSAI supported by the first UE may include the S-NSSAI corresponding to the target network slice.

Thus, the second UE may determine whether to take the first UE as a relay UE according to the HPLMN ID, as well as the RSC corresponding to the each S-NSSAI in the NSSAI carried in the discovery message, or the NSSAI.

Specifically, when the discovery message carries S-NSSAI requested by the second UE or a RSC corresponding to the S-NSSAI, and the HPLMN ID carried in the discovery message is the same as the HPLMN ID of the second UE, the second UE may establish a near-field communication connection with the first UE.

In some embodiments, NSSAI supported by the first UE may be at least one of contract NSSAI of the first UE, subscribed NSSAI of the first UE, or configured NSSAI configured by the network for the first UE. That is, the NSSAI supported by the first UE may include not only S-NSSAI in the allowed NSSAI of the first UE, but also S-NSSAI in rejected NSSAI. This is because a network slice another UE performing relayed communication via the first UE wishes to use is not necessarily in the allowed NSSAI. Therefore, the first UE may carry S-NSSAI corresponding to any supported network slice in a discovery message broadcast.

Note that S301 to S304 may be performed while the first UE and the second UE establish near-field communication, or after the first UE and the second UE have established near-field communication.

To sum up, with a method for network slice authentication according to embodiments of the disclosure, the first UE may carry an HPLMN ID in a discovery message to establish near-field communication with an adjacent second UE, thereby forwarding, for an adjacent second UE, information about authentication of a target network slice, implementing authentication of the target network slice, guaranteeing safety of the slice.

Figure 5:
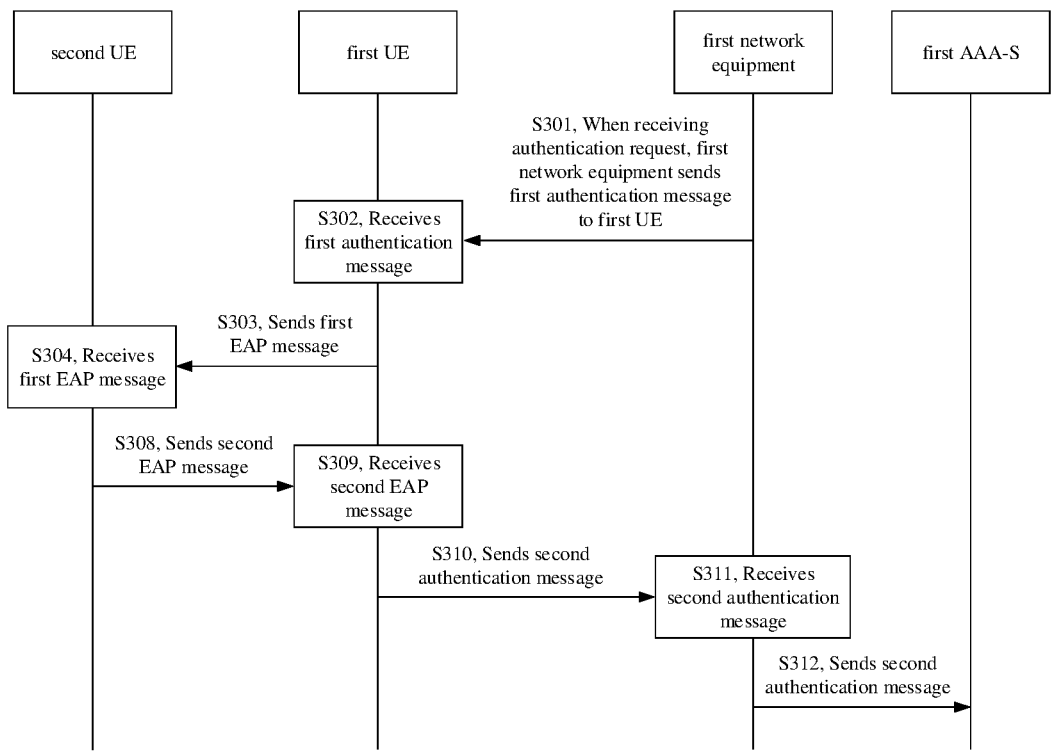
FIG. 5 is a third flowchart of a method for network slice authentication according to an embodiment of the disclosure.

In some embodiments, referring to FIG. 5, a method for network slice authentication according to an embodiment of the disclosure may further include S308 to S312.

At S308, the second UE may send a second EAP message to the first UE. The second EAP message may be used to authenticate legality of use of the target network slice by the second UE.

In some embodiments, having received the first EAP message at S304, the second UE may perform authentication on the first AAA-S based on information about authentication carried in the first EAP message. In case of authentication success, the second UE may generate a second EAP message based on the first EAP message.

The second EAP message may carry information about authentication of the second UE for authenticate legality of use of the target network slice by the second UE, i.e., whether the second UE is allowed to use the target network slice. Illustratively, the second EAP message may include information such as encryption information encrypted using a public key, certificate information of the second UE, etc.

Further, the second UE may send the second EAP message to the first UE through the port PC5.

At S309, the first UE may receive the second EAP message.

The first UE may receive the second EAP message through the port PC5.

At S310, the first UE may send a second authentication message to the first network equipment. The second authentication message may include a second indication and the second EAP message. The second indication may be used to indicate association of the second EAP message with the second UE.

In embodiments of the disclosure, having received the second EAP message, the first UE may determine that the second EAP message is for authenticating the second UE requesting the target network slice. Accordingly, the first UE may generate a second indication, and indicate, using the second indication, that the second EAP message is for the second UE.

Here, the second indication may include the ID of the second UE and/or the S-NSSAI of the target network slice. That is, the first network equipment may indicate, using the ID of the second UE and/or the S-NSSAI of the target network slice, that the second EAP message is associated with the second UE. That is, the second EAP message is for the second UE.

Thus, the first UE may generate a second authentication message according to the second indication and the second EAP message, and send the second authentication message to the first network equipment.

At S311, the first network equipment may receive the second authentication message.

At S312, the first network equipment may send the second authentication message to a first authentication authorization accounting-server (AAA-S).

In embodiments of the disclosure, having received the second authentication message, the first network equipment may send the second authentication message to the home AAA-S of the second UE, i.e., the first AAA-S, such that the first AAA-S may perform authentication on the target network slice requested by the second UE based on the second EAP message.

Specifically, the first AAA-S may acquire a result of authentication by performing authentication on authorization of use of the target network slice by the second UE based on the second EAP message, and return the result of authentication to the first network equipment. Thus, the first network equipment may send the result of authentication to the first UE, such that the first UE may implement a subsequent relay service.

Note that S301 to S304, and S308 to S312 may be performed a number of times. That is, the first EAP message and the second EAP message may be exchanged repeatedly among the first UE, the second UE, the first network equipment, and the first AAA-S, until authentication succeeds or a cutoff number of times are reached.

Understandably, with a method for network slice authentication according to embodiments of the disclosure, the first UE is in charge of forwarding an EAP message between the first network equipment and the second UE, and indicating, using an indication, that the EAP message is for (i.e., about) the second UE, thereby implementing authentication on the target network slice requested by the second UE, guaranteeing safety of the network slice.

Figure 6:
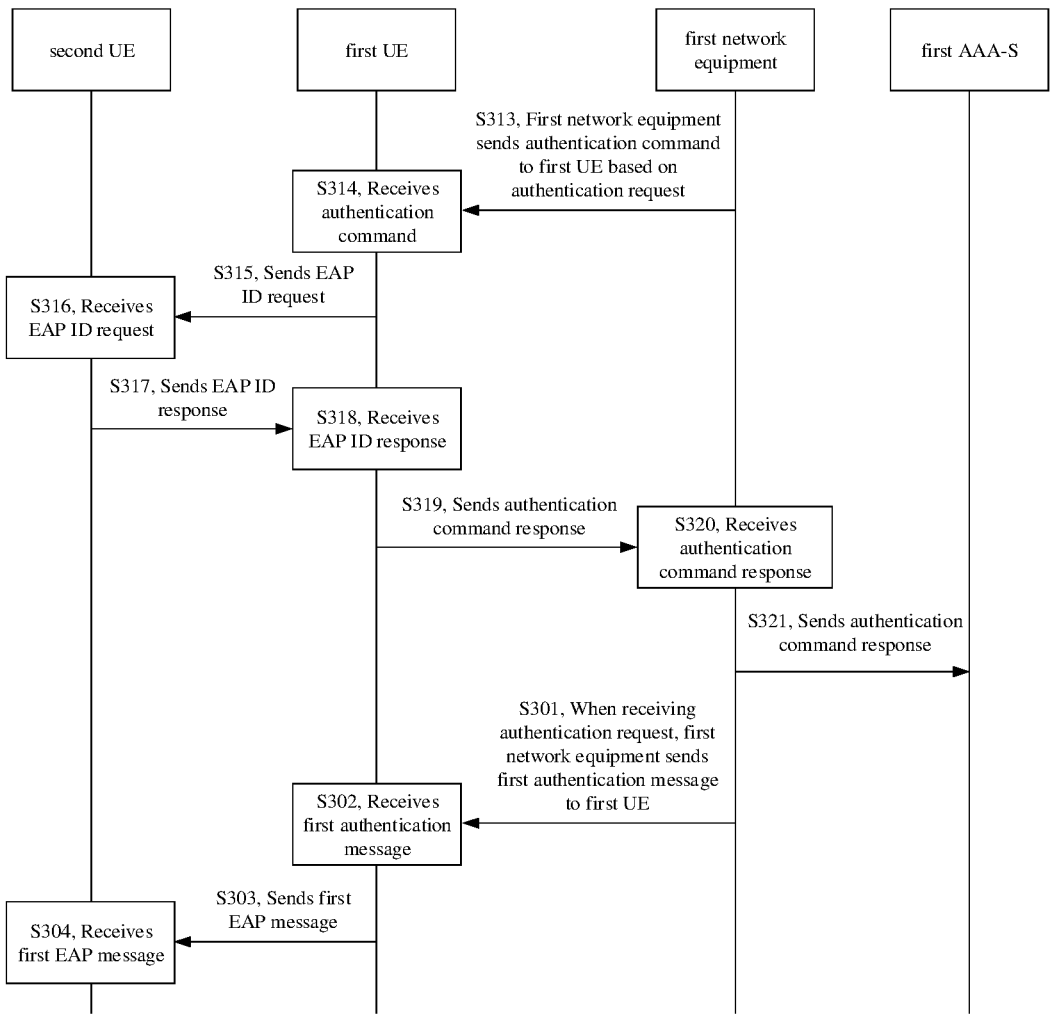
FIG. 6 is a fourth flowchart of a method for network slice authentication according to an embodiment of the disclosure.

In some embodiments, referring to FIG. 6, before sending the first authentication message to the first UE at S301, S313 to S321 may further be performed.

At S313, the first network equipment may send an authentication command to the first UE based on the authentication request. The authentication command may include an EAP identification (ID) request and a third indication. The third indication may indicate that the EAP ID request is to be used by the second UE.

Understandably, having started the flow of authenticating use of the target network slice by the second UE, the first network equipment may send an authentication command to the first UE.

Here, the EAP ID request in the authentication command may be used to request user identity information of the second UE, such that authentication may be performed on identity of the second UE based on the user identity information of the second UE.

In embodiments of the disclosure, the authentication command also is to carry a third indication. The third indication may include the ID of the second UE and/or the S-NSSAI of the target network slice. That is, the first network equipment may indicate, using the ID of the second UE and/or the S-NSSAI of the target network slice, that the EAP ID request is associated with the second UE. That is, the EAP ID request is about (i.e., for) the second UE.

That is, the first network equipment may notify the first UE using the third indication that the EAP ID request in the authentication command is sent to the second UE.

At S314, the first UE may receive the authentication command sent by the first network equipment.

Specifically, the first UE may receive the authentication command through a NAS, and parse the authentication command to acquire the third indication and the EAP ID request.

At S315, the first UE may send the EAP ID request to the second UE.

The first UE may send the EAP ID request to the second UE through a port PC5 based on the third indication.

At S316, the second UE may receive the EAP ID request sent by the first UE.

At S317, the second UE may send an EAP ID response to the first UE.

In embodiments of the disclosure, having received the EAP ID request, the second UE may forward the EAP ID request to an EAP protocol stratum of the second UE, and acquire the EAP ID response by processing the EAP ID request through the EAP protocol stratum.

Here, the EAP ID response may be used to carry authentication information of the second UE, such that the network side may perform authentication on the target network slice requested by the second UE.

Specifically, having acquired the EAP ID response, the second UE may send the EAP ID response to the first UE through a port PC5.

At S318, the first UE may receive the EAP ID response sent by the second UE.

At S319, the first UE may send an authentication command response to the first network equipment. The authentication command response may include a fourth indication and the EAP ID response. The fourth indication may be used to indicate association of the EAP ID response with the second UE.

Understandably, the first UE may forward the EAP ID response to the first network equipment. The first UE may at the same time send a fourth indication, to indicate, using the fourth indication, that the EAP ID response is associated with the second UE. That is, the EAP ID response is for the second UE.

At S320, the first network equipment may receive the authentication command response sent by the first UE.

At S321, the first network equipment may send the authentication command response to the first AAA-S.

Having received the authentication command response, the first network equipment may forward the authentication command response to the first AAA-S to perform authentication on the user identity information of the second UE through the first AAA-S, thereby implementing authentication of the target network slice, guaranteeing safety of the slice.

Figures 7, 8:
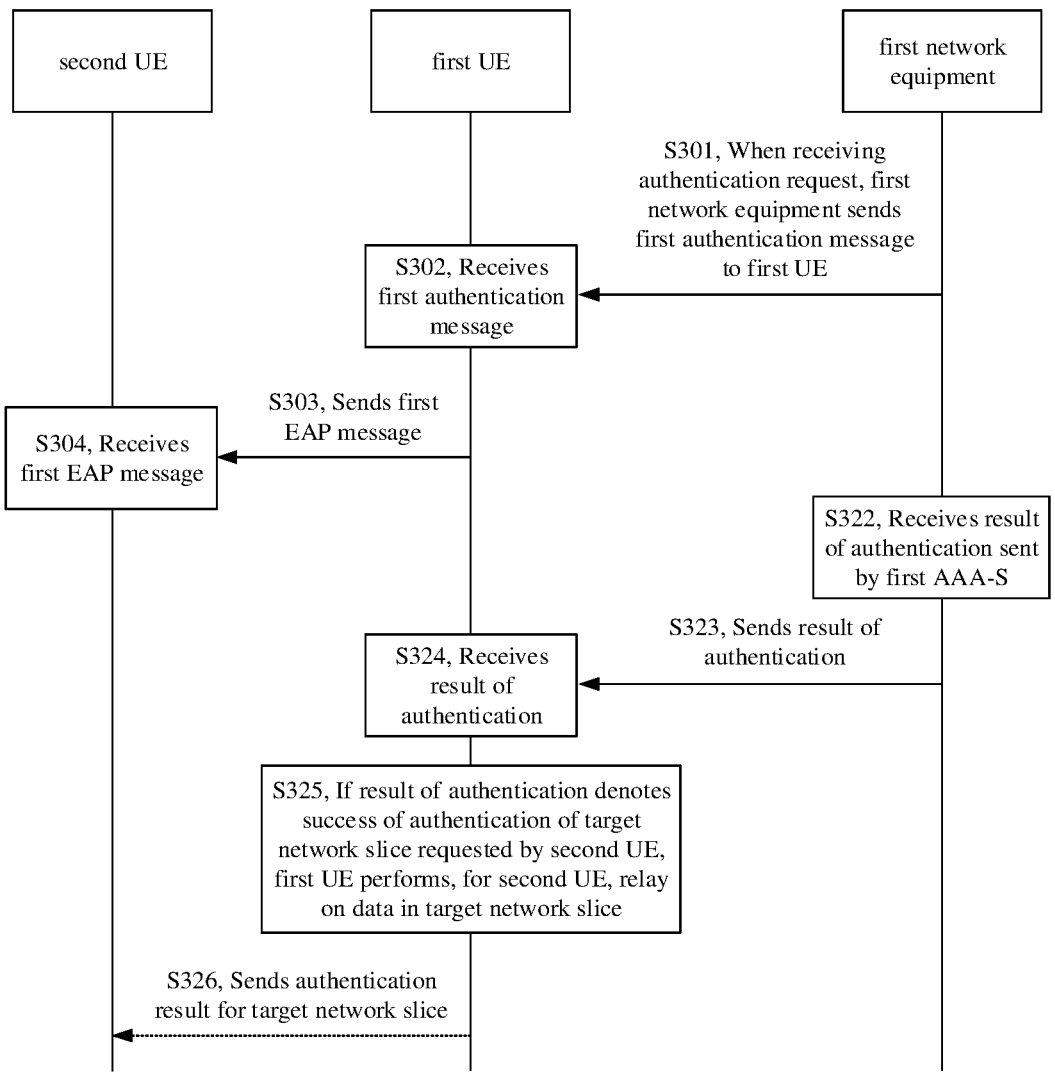
FIG. 7 is a fifth flowchart of a method for network slice authentication according to an embodiment of the disclosure.
FIG. 8 is a sixth flowchart of a method for network slice authentication according to an embodiment of the disclosure.

In some embodiments, referring to the flowchart as shown in FIG. 7, having sent the first authentication message to the first UE at S301, the first network equipment may further perform S322 to S326.

At S322, the first network equipment may receive a result of authentication sent by the first AAA-S. The result of authentication may include an authentication result for the target network slice requested by the second UE.

Specifically, the first AAA-S may acquire a result of authentication by performing authentication on the legality of use of the target network slice by the second UE. Thus, the first AAA-S may notify the first network equipment of the authentication result for the target network slice requested by the second UE.

In embodiments of the disclosure, the result of authentication may carry the authentication result for the target network slice, as well as the ID of the second UE and/or the S-NSSAI of the target network slice, to indicate that the result of authentication is for the target network slice requested by the second UE.

At S323, the first network equipment may send the result of authentication to the first UE.

Understandably, the first network equipment may send the result of authentication to the first UE, notifying the first UE of the authentication result for the target network slice requested by the second UE.

At S324, the first UE may receive the result of authentication sent by the first network equipment.

At S325, if the result of authentication denotes success of authentication of the target network slice requested by the second UE, the first UE may perform, for the second UE, relay on data in the target network slice.

In embodiments of the disclosure, having received the result of authentication, the first UE may determine whether authentication of the target network slice requested by the second UE succeeds.

In case of authentication success, the first UE may determine that the network side has allowed the second UE to use the target network slice. Thus, the first UE may perform, for the second UE, relay on service data in the target network slice.

In case of authentication failure, the first UE may determine that the network side does not allow the second UE to use the target network slice. Thus, the first UE may reject to perform, for the second UE, relay on service data in the target network slice.

Optionally, the method for network slice authentication according to embodiments of the disclosure may further include a step as follows.

At S326, the first UE may send the authentication result for the target network slice to the second UE.

Having acquired the result of authentication, the first UE may send, to the second UE, the authentication result for the target network slice requested by the second UE based on the ID of the second UE in the result of authentication.

Thus, having received the authentication result for the target network slice, the second UE may perform subsequent service processing based on the authentication result. Illustratively, if authentication on the target network slice requested by the second UE fails, the second UE may stop transmitting service data through the target network slice. If authentication on the target network slice requested by the second UE succeeds, the second UE may transmit data of the target network slice through the first UE.

In an embodiment of the disclosure, referring to the flowchart as shown in FIG. 8, the method for network slice authentication according to embodiments of the disclosure may include steps as follows.

At S801, the second UE may receive a discovery message sent by the first UE. The discovery message may include a home public land mobile network (HPLMN) identification (ID) of the first UE.

At S802, if the HPLMN ID of the first UE and an HPLMN ID of the second UE are identical, the second UE may access the first network equipment through the first UE. The first network equipment may refer to a network equipment serving the first UE.

Understandably, the second UE may be adjacent to the first UE. The second UE may receive a discovery message sent by the first UE. Further, the second UE may determine a target network slice to be used according to a current service. If NSSAA is to be performed on the target network slice, the second UE may determine whether the HPLMN of the first UE and the HPLMN of the second UE are the same according to the HPLMN ID of the first UE carried in the discovery message.

In some embodiments, the second UE may also proactively initiate near-field communication.

Specifically, before S801, the second UE may further perform a step as follows.

The second UE may send a discovery request. The discovery request may be used to request a UE around to provide a relay service. The discovery request may include the HPLMN of the second UE and/or the S-NSSAI of the requested target network slice.

Understandably, to use a target network slice, the second UE may initiate near-field communication to perform data transmission using the target network slice through a relay service provided by another UE.

Accordingly, having received the discovery request of the second UE, the first UE may return a discovery response (i.e., the discovery message at S801) to the second UE based on the discovery request. The discovery response may carry the HPLMN ID of the first UE. Thus, having received the discovery message sent by the first UE, the second UE may determine whether the HPLMN of the first UE and the HPLMN of the second UE are the same according to the discovery message sent by the first UE.

In case the HPLMN of the first UE and the HPLMN of the second UE are the same, the second UE may select the first UE, and establish a near-field communication connection with the first UE. Thus, the second UE may access the first network equipment through the first UE to trigger the flow of authentication of the target network slice by the network side.

In some embodiments, the discovery message may also carry the NSSAI supported by the first UE, or a relay service code (RSC) corresponding to each S-NSSAI in the NSSAI. Here, the NSSAI supported by the first UE may include the S-NSSAI corresponding to the target network slice.

Thus, the second UE may determine whether to take the first UE as a relay UE according to the HPLMN ID, as well as the RSC corresponding to the each S-NSSAI in the NSSAI carried in the discovery message, or the NSSAI.

Specifically, when the discovery message carries S-NSSAI requested by the second UE or a RSC corresponding to the S-NSSAI, and the HPLMN ID carried in the discovery message is the same as the HPLMN ID of the second UE, the second UE may establish a near-field communication connection with the first UE.

In some embodiments, NSSAI supported by the first UE may be at least one of contract NSSAI of the first UE, subscribed NSSAI of the first UE, or configured NSSAI configured by the network for the first UE. That is, the NSSAI supported by the first UE may include not only S-NSSAI in the allowed NSSAI of the first UE, but also S-NSSAI in rejected NSSAI. This is because a network slice another UE performing relayed communication via the first UE wishes to use is not necessarily in the allowed NSSAI. Therefore, the first UE may carry S-NSSAI corresponding to any supported network slice in a discovery message broadcast.

To sum up, with a method for network slice authentication according to embodiments of the disclosure, the first UE may carry an HPLMN ID in a discovery message to establish near-field communication with an adjacent second UE, thereby forwarding, for an adjacent second UE, information about authentication of a target network slice, implementing authentication of the target network slice, guaranteeing safety of the slice.

A method for network slice authentication according to embodiments of the disclosure is elaborated below with reference to an actual application scene.

Figure 9:
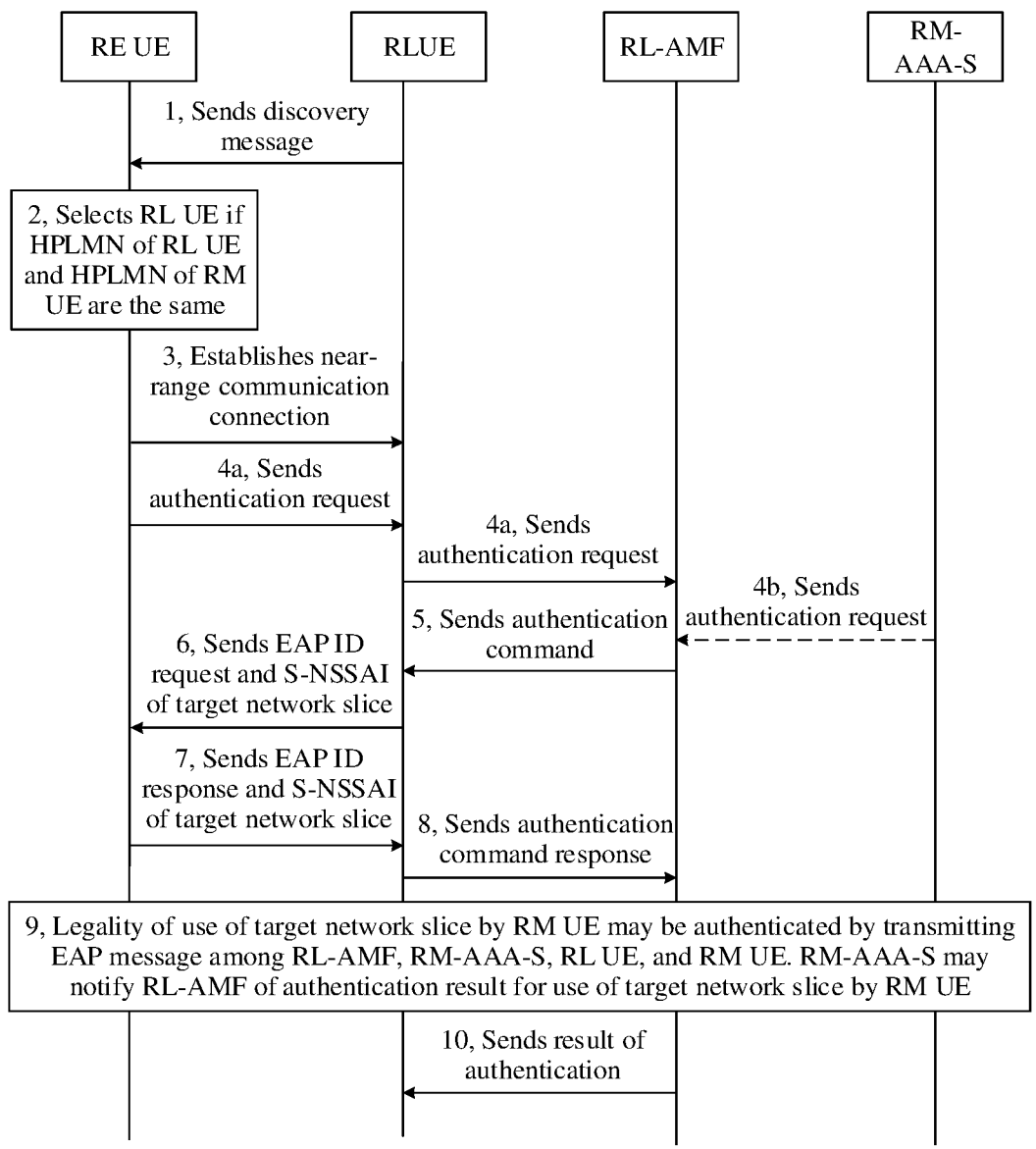
FIG. 9 is a seventh flowchart of a method for network slice authentication according to an embodiment of the disclosure.

Referring to the flowchart as shown in FIG. 9, a method for network slice authentication according to embodiments of the disclosure may include steps as follows.

At S1, an RL UE may send a discovery message.

Here, the RL UE may be the first UE in an embodiment presented above, and may provide another UE with a relay service.

In embodiments of the disclosure, a discovery message may include the HPLMN ID of the first UE. In addition, the discovery message may further include the NSSAI supported by the RL UE or an RSC corresponding to each S-NSSAI in the NSSAI.

In embodiments of the disclosure, the NSSAI supported by the RL UE, or RSC associated S-NSSAI, may include all S-NSSAI in contract NSSAI of the RL UE, subscribed NSSAI of the RL UE, and configured NSSAI configured by the network for the RL UE. Optionally, the NSSAI supported by the RL UE, or RSC associated S-NSSAI, may include S-NSSAI in rejected NSSAI.

Optionally, the NSSAI supported by the RL UE, or RSC associated S-NSSAI, may be contract S-NSSAI of the RL UE. That is, the number of the NSSAI supported by the RL UE or RSC associated S-NSSAI is greater than or equal to the number of allowed NSSAI. This is because a network slice requested by a UE performing relayed transmission via the RL UE is not necessarily in the allowed NSSAI.

At S2, having received the discovery message, the RM UE may check whether the RL UE and the RM UE belong to one HPLMN. If the RL UE and the RM UE belong to one HPLMN, the RM UE may select the RL UE.

The RM UE may be the second UE in an embodiment presented above.

In embodiments of the disclosure, the RM UE may determine a target network slice to be used according to a current service. When NSSAA is required for the target network slice to be used, the second UE may receive a discovery message to access the network through another UE to implement authentication of the target network slice.

At S3, the RM UE may establish a near-field communication connection with the RL UE.

Specifically, the RM UE may establish a near-field communication connection with the RL UE based on a discovery message. Thus, the RM UE may access the network through the RL UE, and communicate with the network side through an AMF network element corresponding to the RL UE.

Note that the subsequent S4 to S10 may take place during or after establishment of the communication.

At S4, a flow of NSSAA authentication performed by RL-AMF on the target network slice may be triggered.

Here, the RL-AMF may be the first network equipment in an embodiment presented above. The RL-AMF may be current may be an AMF network element providing the RL UE with a service.

In embodiments of the disclosure, the RL-AMF may be triggered to perform a flow of NSSAA of the target network slice. The trigger operation may be sent by the RL UE or the RM-AAA-S.

Here, the RM-AAA-S may be the first AAA-S in an embodiment presented above, and may be deployed where the RM UE belongs.

In a possible implementation, the S4 may be implemented through S4a.

At S4a, the RM UE may send an authentication request to the RL UE. The RL UE may forward the authentication request to the RL-AMF to trigger performing authentication by the RL-AMF on use of the target network slice by the RM UE.

Here, the authentication request may include the S-NSSAI of the requested target network slice, the HPLMN ID of the RM UE, and the ID of the RM UE.

In another possible implementation, the S4 may further be implemented through S4b.

At S4b, the RM-AAA-S may send an authentication request to the RL-AMF to trigger performing authentication by the RL-AMF on use of the target network slice by the RM UE.

Here, the RM UE may trigger performing NSSAA by the RM-AAA-S through an application stratum.

At S5, the RL-AMF may send an authentication command (NSSAA command) to the RL UE.

The authentication command may include an EAP ID request to be sent to the RM UE.

In addition, the authentication command may further contain the S-NSSAI of the target network slice and the ID of the RM UE, to inform the RL UE that the EAP ID request is to be sent to the RM UE.

At S6, the RL UE may send, to the RM UE, the EAP ID request and the S-NSSAI of the target network slice as received.

Specifically, having received the authentication command (NSSAA command), the NAS of the RL UE may send the EAP ID request and the S-NSSAI of the target network slice to a stratum PC5 per se. The EAP ID request and the S-NSSAI of the target network slice may be sent to the RM UE through the port PC5.

At S7, having received the EAP ID request and the S-NSSAI of the target network slice, the RM UE may generate an EAP ID response, and send the EAP ID response and the S-NSSAI of the target network slice to the RL UE.

Specifically, having received the EAP ID request, the RM UE may forward the EAP ID request to an EAP protocol stratum of the RM UE, and process the EAP ID request through the EAP protocol stratum to acquire an EAP ID response.

At S8, the RL UE may send an authentication command response to the RL AMF.

The authentication command response may include the EAP ID response, the S-NSSAI of the target network slice, and the ID of the RM UE. Here, the RL UE may indicate, through the ID of the RM UE carried in the authentication command response, that the EAP ID response is sent for the RM UE.

At S9, EAP messages may be transmitted among the RL-AMF, the RM-AAA-S, the RL UE, and the RM UE to perform authentication on legality of use of the target network slice by the RM UE. The RM-AAA-S may notify the RL-AMF of an authentication result for use of the target network slice by the RM UE.

Here, an EAP message may carry information about authentication of the RM UE, such as certificate information, key information, etc. An EAP message here may include the first EAP message and/or the second EAP message in an embodiment presented above.

Note that during authentication, a NSSAAF network element of the RM UE may also take part in the authentication flow, which is not reflected in FIG. 9.

In embodiments of the disclosure, the RL UE is in charge of forwarding an EAP message between the RL-AMF and the RM UE. Any signaling in between the AMF and the RL UE may have to contain the RM UE ID and RM HPLMN S-NSSAI to indicate that the EAP message is sent for the RM.

At S10, the RL-AMF may send a result of authentication to the RL UE.

Here, the result of authentication may include an authentication result for the target network slice, as well as the ID of the RM UE and the HPLMN ID of the RM UE, indicating that the authentication result for the target network slice is sent for the RM UE.

Further, having received the result of authentication, the RL UE may determine whether the network side allows use of the target network slice by the RM UE. If the network side allows use of the target network slice by the RM UE, the RL UE may perform, for the RM UE, relay on service data in the target network slice.

Figure 10:
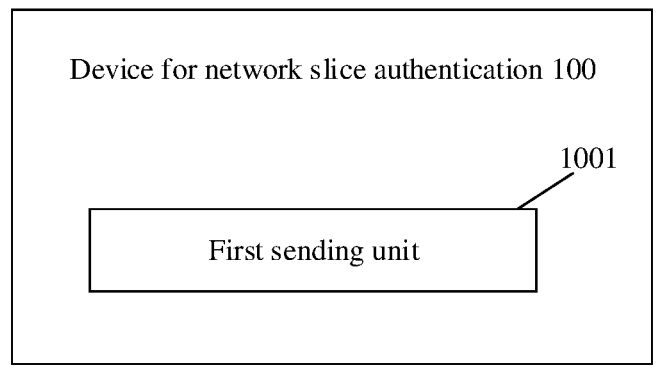
FIG. 10 is a first diagram of a structure of a device for network slice authentication according to an embodiment of the disclosure.

An embodiment of the disclosure provides a method for network slice authentication. The device may apply to the first network equipment according to an embodiment presented above. As shown in FIG. 10, a device 100 for network slice authentication according to an embodiment of the disclosure may include a first sending unit.

The first sending unit 1001 may be configured to, in response to receiving an authentication request, send a first authentication message to a first user equipment (UE). The authentication request is used to trigger an authentication flow for a second user equipment (UE) requesting to use a target network slice. The second UE accesses the first network equipment through the first UE.

The first authentication message includes a first indication and a first extensible authentication protocol (EAP) message. The first indication indicates that the first EAP message is used to be used by the second UE. The first EAP message is used to authenticate legality of use of the target network slice by the second UE.

In some embodiments, the first UE and the second UE may be of one home public land mobile network (HPLMN).

In some embodiments, the authentication request may be sent by the first UE or a first authentication authorization accounting-server (AAA-S). The first AAA-S may be a home AAA-S of the second UE.

In some embodiments, the authentication request may include at least one of an identification (ID) of the second UE, single-network slice selection assistance information (S-NSSAI) corresponding to the target network slice, or an HPLMN ID of the second UE.

In some embodiments, the device 100 for network slice authentication may further include a first receiving unit.

The first receiving unit may be configured to receive a second authentication message sent by the first UE.

The first sending unit 1001 may be further configured to send the second authentication message to a first authentication authorization accounting-server (AAA-S).

The second authentication message may include a second indication and a second EAP message. The second indication may indicate association of the second EAP message with the second UE. The second EAP message may be used to authenticate the legality of use of the target network slice by the second UE.

In some embodiments, the first sending unit 1001 may be further configured to send an authentication command to the first UE based on the authentication request. The authentication command may include an EAP identification (ID) request and a third indication. The third indication may indicate that the EAP ID request is used to be used by the second UE.

The first receiving unit may be further configured to receive an authentication command response sent by the first UE. The authentication command response may include a fourth indication and an EAP ID response. The fourth indication may indicate association of the EAP ID response with the second UE.

In some embodiments, the first receiving unit may be further configured to receive a result of authentication sent by a first authentication authorization accounting-server (AAA-S). The result of authentication may include an authentication result for the target network slice requested by the second UE.

The first sending unit 1001 may be configured to send the result of authentication to the first UE.

Figure 11:
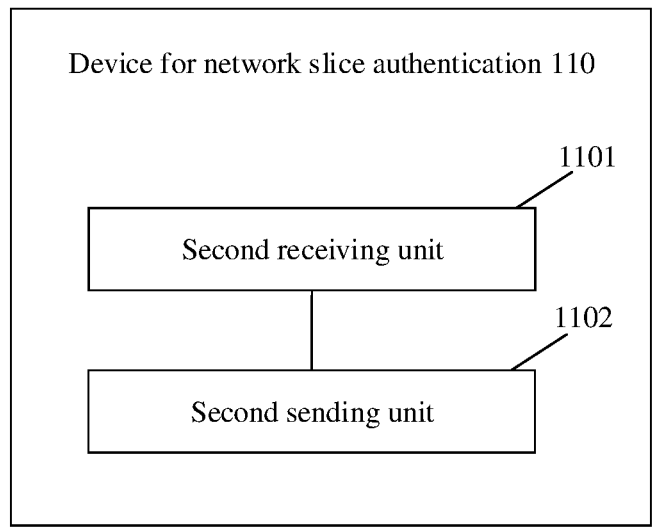
FIG. 11 is a second diagram of a structure of a device for network slice authentication according to an embodiment of the disclosure.

An embodiment of the disclosure further provides a device for network slice authentication. The device may apply to the first UE according to an embodiment presented above. As shown in FIG. 11, a device 110 for network slice authentication according to an embodiment of the disclosure may include a second receiving unit and a second sending unit.

The second receiving unit 1101 may be configured to receive a first authentication message sent by a first network equipment. The first authentication message includes a first indication and a first extensible authentication protocol (EAP) message. The first indication indicates that the first EAP message applies to a second UE. The first EAP message is used to authenticate legality of a target network slice requested to be used by the second UE.

The second sending unit 1102 may be configured to send the first EAP message to the second UE. The second UE accesses the first network equipment through the first UE.

In some embodiments, the first UE and the second UE may be of one home public land mobile network (HPLMN).

In some embodiments, the second sending unit 1102 may be configured to send an authentication request to the first network equipment. The authentication request may be used to trigger an authentication flow for the second UE requesting to use the target network slice.

In some embodiments, the authentication request may include at least one of an identification (ID) of the second UE, single-network slice selection assistance information (S-NSSAI) corresponding to the target network slice, or a home public land mobile network (HPLMN) ID of the second UE.

In some embodiments, the second receiving unit 1101 may be configured to receive a second EAP message sent by the second UE. The second EAP message may be used to authenticate legality of use of the target network slice by the second UE.

The second sending unit may be configured to send a second authentication message to the first network equipment.

The second authentication message may include a second indication and the second EAP message. The second indication may indicate association of the second EAP message with the second UE.

In some embodiments, the second receiving unit 1101 may be configured to receive an authentication command sent by the first network equipment. The authentication command may include an EAP identification (ID) request and a third indication. The third indication may indicate that the EAP ID request may be configured to be used by the second UE.

The second sending unit 1102 may be configured to send the EAP ID request to the second UE.

In some embodiments, the second receiving unit 1101 may be configured to receive an EAP ID response sent by the second UE.

The second sending unit 1102 may be further configured to send an authentication command response to the first network equipment. The authentication command response may include a fourth indication and the EAP ID response. The fourth indication may indicate association of the EAP ID response with the second UE.

In some embodiments, the second receiving unit 1101 may be further configured to receive a result of authentication sent by the first network equipment. The result of authentication may include an authentication result for the target network slice requested by the second UE.

Here, the device 110 for network slice authentication may further include a processing unit. The processing unit may be configured to, in response to that the result of authentication denotes success of authentication of the target network slice requested by the second UE, perform, for the second UE, relay on data in the target network slice.

In some embodiments, the second sending unit may be further configured to send a discovery message. The discovery message may include a home public land mobile network (HPLMN) identification (ID) of the first UE.

Figure 12:
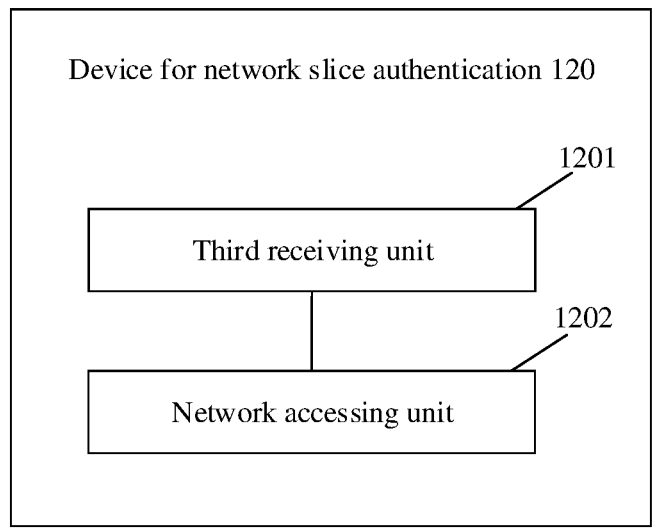
FIG. 12 is a third diagram of a structure of a device for network slice authentication according to an embodiment of the disclosure.

An embodiment of the disclosure further provides a device for network slice authentication. The device may apply to the second UE according to an embodiment presented above. As shown in FIG. 12, a device 120 for network slice authentication according to an embodiment of the disclosure may include a third receiving unit.

The third receiving unit 1201 may be configured to receive a first extensible authentication protocol (EAP) message sent by a first UE. The first EAP message is used to authenticate legality of a target network slice requested to be used by the second UE. The second UE accesses a first network equipment through the first UE.

In some embodiments, the first UE and the second UE may be of one home public land mobile network (HPLMN).

In some embodiments, the device 120 for network slice authentication may further include a third sending unit. The third sending unit may be configured to send an authentication request. The authentication request may be used to trigger an authentication flow for the second UE requesting to use the target network slice.

In some embodiments, the third sending unit may be configured to send the authentication request to the first UE through a port PC5; or send the authentication request to a first authentication authorization accounting-server (AAA-S) through an application stratum. The first AAA-S may be a home AAA-S of the second UE.

In some embodiments, the authentication request may include at least one of an identification (ID) of the second UE, single-network slice selection assistance information (S-NSSAI) corresponding to the target network slice, or an HPLMN ID of the second UE.

In some embodiments, the third sending unit may be configured to send a second EAP message to the first UE. The second EAP message may be used to authenticate legality of use of the target network slice by the second UE.

In some embodiments, the third receiving unit 1201 may be configured to receive an EAP identification (ID) request sent by the first UE.

The third sending unit may be configured to send an EAP ID response to the first UE.

In some embodiments, the third receiving unit 1201 may be configured to receive a discovery message sent by the first UE. The discovery message may include a home public land mobile network (HPLMN) identification (ID) of the first UE.

Here, referring to FIG. 12, a device 120 for network slice authentication according to an embodiment of the disclosure may further include a network accessing unit 1202 configured to, in response to the HPLMN ID of the first UE and an HPLMN ID of the second UE being identical, access the first network equipment through the first UE.

Based on an embodiment presented above, embodiments of the disclosure further provide a device for network slice authentication. The device may apply to the second UE according to an embodiment presented above. As shown in FIG. 12, a device 120 for network slice authentication according to an embodiment of the disclosure may include a third receiving unit and a network accessing unit.

The third receiving unit 1201 may be configured to receive a discovery message sent by a first UE. The discovery message may include a home public land mobile network (HPLMN) identification (ID) of the first UE.

The network accessing unit 1202 may be configured to, in response to the HPLMN ID of the first UE and an HPLMN ID of the second UE being identical, access, through the first UE, a first network equipment. The first network equipment serves the first UE.

Note that functional units in the embodiments may be integrated in one processing module, or exist as separate units respectively; or two or more such units may be integrated in one module. The integrated module may be implemented in form of hardware or software functional unit(s).

When implemented in form of a software functional module and sold or used as an independent product, an integrated module may be stored in a computer-readable storage medium. Based on such an understanding, the essential part or a part contributing to prior art of the technical solution of an embodiment here, or all or part of the technical solution, may appear in form of a software product, which software product is stored in storage media, and includes a number of instructions for allowing computer equipment (such as a personal computer, a server, network equipment, and/or the like) or a processor to execute all or part of the methods in various embodiments of the disclosure. The storage media include various media that can store program codes, such as a U disk, a mobile hard disk, Read Only Memory (ROM), Random Access Memory (RAM), a magnetic disk, a CD, and/or the like.

Figure 13:
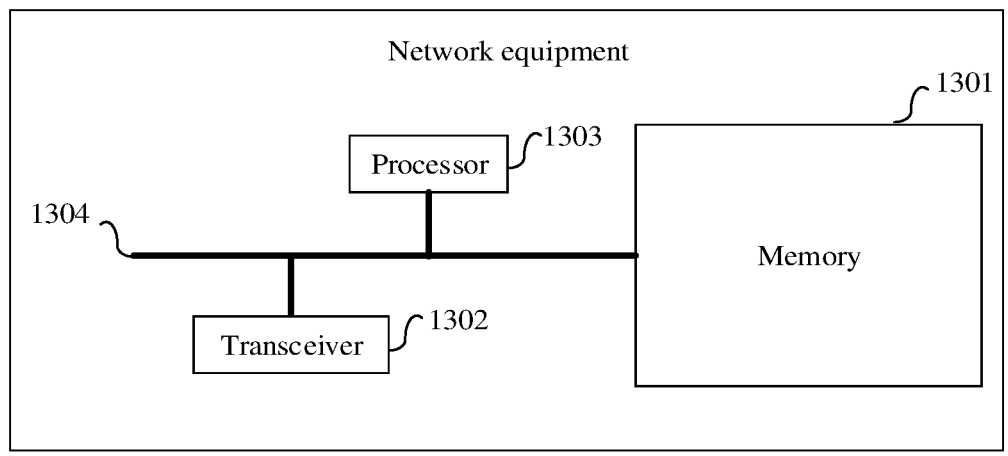
FIG. 13 is a block diagram of a network equipment according to an embodiment of the disclosure.

Based on an embodiment presented above, based on an embodiment presented above further provides a network equipment. As shown in FIG. 13, a network equipment according to an embodiment of the disclosure may include a memory 1301, a transceiver 1302, a processor 1303, and a bus system 1304.

The memory 1301 may be configured to store a program and an instruction.

The transceiver 1302 may be configured to receive or send information as controlled by the processor 1303.

The processor 1303 may be configured to execute the program in the memory 1301.

The bus system 1304 may be configured to connect the memory 1301, the transceiver 1302, and the processor 1303 to allow communication among the memory 1301, the transceiver 1302, and the processor 1303.

The processor 1303 may be configured to call the program instruction in the memory 1301 to control sending to send a first authentication message by the transceiver 1302 to a first user equipment (UE) in response to receiving an authentication request.

The authentication request is used to trigger an authentication flow for a second user equipment (UE) requesting to use a target network slice. The second UE accesses the first network equipment through the first UE.

The first authentication message includes a first indication and a first extensible authentication protocol (EAP) message. The first indication indicates that the first EAP message is used to be used by the second UE. The first EAP message is used to authenticate legality of use of the target network slice by the second UE.

In some embodiments, the processor 1303 may be configured to call the program instruction in the memory 1301 to control implementation, by the transceiver 1302, of:
receiving a second authentication message sent by the first UE; and
sending the second authentication message to a first authentication authorization accounting-server (AAA-S).

The second authentication message may include a second indication and a second EAP message. The second indication may indicate association of the second EAP message with the second UE. The second EAP message may be used to authenticate the legality of use of the target network slice by the second UE.

In some embodiments, the processor 1303 may be further configured to call the program instruction in the memory 1301 to control implementation, by the transceiver 1302, of:
sending an authentication command to the first UE based on the authentication request, the authentication command including an EAP identification (ID) request and a third indication, the third indication indicating that the EAP ID request is used to be used by the second UE; and receiving an authentication command response sent by the first UE.

The authentication command response may include a fourth indication and an EAP ID response. The fourth indication may indicate association of the EAP ID response with the second UE.

In some embodiments, the processor 1303 may be further configured to call the program instruction in the memory 1301 to control implementation, by the transceiver 1302, of:
receiving a result of authentication sent by a first authentication authorization accounting-server (AAA-S), the result of authentication including an authentication result for the target network slice requested by the second UE; and
sending the result of authentication to the first UE.

Figure 14:
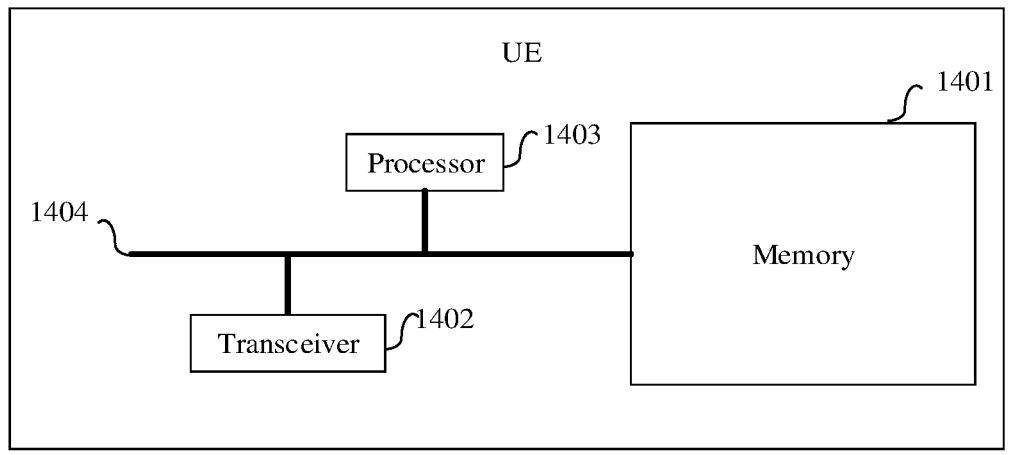
FIG. 14 is a block diagram of a UE according to an embodiment of the disclosure.

An embodiment of the disclosure further provides a user equipment (UE). As shown in FIG. 14, a UE according to an embodiment of the disclosure may include a memory 1401, a transceiver 1402, a processor 1403, and a bus system 1404.

The memory 1401 may be configured to store a program and an instruction.

The transceiver 1403 may be configured to receive or send information as controlled by the processor 1403.

The processor 1403 may be configured to execute the program in the memory 1401.

The bus system 1404 may be configured to connect the memory 1401, the transceiver 1402, and the processor 1403 to allow communication among the memory 1401, the transceiver 1402, and the processor 1403.

The processor 1403 may be configured to call the program instruction in the memory 1401 to control implementation, by the transceiver 1402, of:
receiving a first authentication message sent by a first network equipment, the first authentication message including a first indication and a first extensible authentication protocol (EAP) message, the first indication indicating that the first EAP message is used to be used by a second UE, the first EAP message being used to authenticate legality of a target network slice requested to be used by the second UE; and sending the first EAP message to the second UE.

The second UE accesses the first network equipment through the first UE.

In some embodiments, the processor 1403 may be further configured to call the program instruction in the memory 1401 to control sending an authentication request to the first network equipment by the transceiver 1402.

The authentication request may be used to trigger an authentication flow for the second UE requesting to use the target network slice.

In some embodiments, the processor 1403 may be further configured to call the program instruction in the memory 1401 to control implementation, by the transceiver 1402, of:
receiving a second EAP message sent by the second UE, the second EAP message being used to authenticate legality of use of the target network slice by the second UE; and
sending a second authentication message to the first network equipment.

The second authentication message may include a second indication and the second EAP message. The second indication may indicate association of the second EAP message with the second UE.

In some embodiments, the processor 1403 may be further configured to call the program instruction in the memory 1401 to control implementation, by the transceiver 1402, of:
receiving an authentication command sent by the first network equipment, the authentication command including an EAP identification (ID) request and a third indication, the third indication indicating that the EAP ID request is used to be used by the second UE; and sending the EAP ID request to the second UE.

In some embodiments, the processor 1403 may be further configured to call the program instruction in the memory 1401 to control implementation, by the transceiver 1402, of:
receiving an EAP ID response sent by the second UE; and
sending an authentication command response to the first network equipment.

The authentication command response may include a fourth indication and the EAP ID response. The fourth indication may indicate association of the EAP ID response with the second UE.

In some embodiments, the processor 1403 may be further configured to call the program instruction in the memory 1401 to control implementation, by the transceiver 1402, of:
receiving a result of authentication sent by the first network equipment, the result of authentication including an authentication result for the target network slice requested by the second UE; and in response to that the result of authentication denotes success of authentication of the target network slice requested by the second UE, performing, for the second UE, relay on data in the target network slice.

In some embodiments, the processor 1403 may be further configured to call the program instruction in the memory 1401 to control sending a discovery message by the transceiver 1402.

The discovery message may include a home public land mobile network (HPLMN) identification (ID) of the first UE.

In some embodiments of the disclosure, the processor 1403 may be further configured to call the program instruction in the memory 1401 to control receiving, by the transceiver 1402, a first extensible authentication protocol (EAP) message sent by a first UE.

The first EAP message is used to authenticate legality of a target network slice requested to be used by the second UE. The second UE accesses a first network equipment through the first UE.

In some embodiments, the processor 1403 may be further configured to call the program instruction in the memory 1401 to control sending an authentication request by the transceiver 1402.

The authentication request may be used to trigger an authentication flow for the second UE requesting to use the target network slice.

In some embodiments, the processor 1403 may be further configured to call the program instruction in the memory 1401 to control implementation, by the transceiver 1402, of:

sending the authentication request to the first UE through a port PC5; or sending the authentication request to a first authentication authorization accounting-server (AAA-S) through an application stratum.

The first AAA-S may be a home AAA-S of the second UE.

In some embodiments, the processor 1403 may be further configured to call the program instruction in the memory 1401 to control sending a second EAP message to the first UE by the transceiver 1402.

The second EAP message may be used to authenticate legality of use of the target network slice by the second UE.

In some embodiments, the processor 1403 may be further configured to call the program instruction in the memory 1401 to control implementation, by the transceiver 1402, of:

receiving an EAP identification (ID) request sent by the first UE; and sending an EAP ID response to the first UE.

In some embodiments, the processor 1403 may be further configured to call the program instruction in the memory 1401 to control receiving, by the transceiver 1402, a discovery message sent by the first UE.

The discovery message may include a home public land mobile network (HPLMN) identification (ID) of the first UE.

Accordingly, the processor 1403 may be further configured to, in response to the HPLMN ID of the first UE and an HPLMN ID of the second UE being identical, access the first network equipment through the first UE.

In embodiments according to the disclosure, a processor may be at least one of an application specific integrated circuit (ASIC), a digital signal processor (DSP), a digital signal processing device (DSPD), a programmable logic device (PLD), a field programmable gate array (FPGA), a central processing unit (CPU), a controller, etc. Understandably, for different equipment, the electronic device used to implement the above-mentioned processor functions may also be the other, which is not specifically limited in embodiments of the disclosure.

In a practical application, a memory may be a volatile memory such as RAM; or a non-volatile memory such as ROM, a flash memory, a hard disk drive (HDD), or a solid-state drive (SSD); or a combination of the foregoing types of memories, and provide instructions and data to the processor 1101.

Embodiments of the disclosure further provide a computer storage medium, specifically a computer-readable storage medium, having stored thereon computer instructions. When the computer storage medium is located on a network equipment or a UE, the computer instructions, when executed by a processor, implement any steps of a method for network slice authentication in an embodiment of the disclosure.

A computer storage medium/memory herein may be a memory such as a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc, or a compact disc read-only memory (CD-ROM), etc., or may be a UE that includes a memory mentioned above or a combination of any of the memories, such as a mobile phone, a computer, a tablet equipment, a personal digital assistant (PDA), etc.

Understandably, "one embodiment" or "an embodiment" or "embodiment(s) of the disclosure" or "an embodiment presented above" or "some embodiments" mentioned throughout the specification implies that a target feature, structure, or characteristics involved in the embodiment is included in at least one embodiment of the disclosure. Therefore, "in one embodiment" or "in an embodiment" or "embodiment(s) of the disclosure" or "an embodiment presented above" or "some embodiments" appearing throughout the specification does not necessarily refer to the same embodiment. In addition, such a target feature, structure, or characteristics may be combined in one or more embodiments in any appropriate mode. Understandably, a magnitude of a sequence number of a process in embodiments of the disclosure does not indicate an order in which the process is executed. The processes are to be executed in an order determined by functions and intrinsic logics of the processes. Such a sequence number shall constitute no limit to implementation of the embodiments of the disclosure. Numbering of embodiments of the disclosure is merely for illustration and does not indicate preference of one embodiment over another.

Unless explicitly specified otherwise, implementing/performing any step in an embodiment of the disclosure by a detector equipment may refer to implementing/performing the step by a processor of the detector equipment. Unless explicitly specified otherwise, an embodiment of the disclosure does not limit the order in which the detector equipment performs/implements steps therein. In addition, in different embodiments, data may be processed with the same method or with different methods. Further note that any step in an embodiment of the disclosure may be performed/implemented separately by the detector equipment. That is, the detector equipment may implement any step in the embodiment independent of implementation of any other step.

In a number of embodiments provided in the disclosure, it should be understood that an equipment and method disclosed may be implemented in other ways. For example, described equipment implementation is merely illustrative. For example, module or part division is merely logic function division and there may be another division in actual implementation. For example, parts or components can be combined, or integrated into another system, or some features/characteristics may be omitted or skipped. Furthermore, the coupling, or direct coupling or communicational connection illustrated or discussed herein may be implemented through indirect coupling or communicational connection among some interfaces, devices, or parts, and may be electrical, mechanical, or of another form.

The units described as separate components may or may not be physically separated. Components shown as units may be or may not be physical units. They may be located in one place, or distributed on multiple network units. Some or all of the units may be selected to achieve the purpose of a solution of the present embodiments as needed.

In addition, various functional units in each embodiment of the disclosure may be integrated in one processing unit, or exist as separate units respectively; or two or more such units may be integrated in one unit. The integrated unit may be implemented in form of hardware, or hardware plus software functional unit(s).

Methods disclosed in method embodiments of the disclosure may be combined with each other as needed to acquire a new method embodiment, as long as no conflict results from the combination.

Features disclosed in product embodiments of the disclosure may be combined with each other as needed to acquire a new product embodiment, as long as no conflict results from the combination.

Features disclosed in method or equipment embodiments provided by the disclosure may be combined with each other as needed to acquire a new method or equipment embodiment, as long as no conflict results from the combination.

A person having ordinary skill in the art may understand that all or part of the steps of the embodiments may be implemented by instructing a related hardware through a program, which program may be stored in a (non-transitory) computer-readable storage medium and when executed, execute steps including those of the embodiments. The computer-readable storage medium may be various media that can store program codes, such as mobile storage equipment, Read Only Memory (ROM), a magnetic disk, a CD, and/or the like.

Alternatively, when implemented in form of a software functional module and sold or used as an independent product, an integrated module herein may also be stored in a (non-transitory) computer-readable storage medium. Based on such an understanding, the essential part or a part contributing to prior art of the technical solution of an embodiment of the disclosure may appear in form of a software product, which software product is stored in storage media, and includes a number of instructions for allowing computer equipment (such as a personal computer, a server, network equipment, and/or the like) to execute all or part of the methods in various embodiments of the disclosure. The storage media include various media that can store program codes, such as mobile storage equipment, ROM, a magnetic disk, a CD, and/or the like.

In embodiments of the disclosure, one may refer to description of a step, content, etc., in one embodiment for the same step, content, etc., in another embodiment. In an embodiment of the disclosure, a term "and" does not affect the order of steps.

What described is just embodiments of the disclosure and is not intended to limit the scope of the disclosure. Any modification, equivalent replacement, and/or the like made within the technical scope of the disclosure, as may occur to a person having ordinary skill in the art, shall be included in the scope of the disclosure. The scope of the disclosure thus should be determined by the claims.

The invention claimed is:

1. A network equipment, comprising a memory, a transceiver, a processor, and a bus system,
wherein the memory is configured to store instructions,
wherein the transceiver is configured to receive or send information as controlled by the processor,
wherein the processor is configured to execute the instructions in the memory,
wherein the bus system is configured to connect the memory, the transceiver, and the processor to allow communication among the memory, the transceiver, and the processor,
wherein the processor is configured to call the instructions in the memory to implement operations of:
in response to receiving an authentication request, sending a first authentication message to a first user equipment (UE), the authentication request being used to trigger an authentication flow for a second user equipment (UE) requesting to use a target network slice, the second UE accessing the first network equipment through the first UE,
the first authentication message comprising a first indication and a first extensible authentication protocol (EAP) message, the first indication indicating that the first EAP message is to be used by the second UE, the first EAP message being used to authenticate legality of use of the target network slice by the second UE.

2. The network equipment of claim 1, wherein the first UE and the second UE are of a same home public land mobile network (HPLMN).

3. The network equipment of claim 1, wherein the authentication request is sent by the first UE or a first authentication authorization accounting-server (AAA-S), the first AAA-S being a home AAA-S of the second UE.

4. The network equipment of claim 1, wherein the authentication request comprises at least one of: an identification (ID) of the second UE, single-network slice selection assistance information (S-NSSAI) corresponding to the target network slice, or an HPLMN ID of the second UE.

5. The network equipment of claim 1, wherein the processor is further configured to call the instructions in the memory to implement operations of:
receiving a second authentication message sent by the first UE; and
sending the second authentication message to a first authentication authorization accounting-server (AAA-S),
wherein the second authentication message comprises a second indication and a second EAP message, the second indication indicating association of the second EAP message with the second UE, the second EAP message being used to authenticate the legality of use of the target network slice by the second UE.

6. The network equipment of claim 1, wherein the processor is further configured to call the instructions in the memory to implement operations of:
before sending the first authentication message to the first UE, sending an authentication command to the first UE based on the authentication request, the authentication command comprising an EAP identification (ID)

request and a third indication, the third indication indicating that the EAP ID request is used to be used by the second UE; and receiving an authentication command response sent by the first UE, the authentication command response comprising a fourth indication and an EAP ID response, the fourth indication indicating association of the EAP ID response with the second UE.

7. The network equipment of claim 1, wherein the processor is further configured to call the instructions in the memory to implement operations of:

after sending the first authentication message to the first UE, receiving a result of authentication sent by a first authentication authorization accounting-server (AAA-S), the result of authentication comprising an authentication result for the target network slice requested by the second UE; and sending the result of authentication to the first UE.

8. A first user equipment (UE), comprising a memory, a transceiver, a processor, and a bus system, wherein the memory is configured to store instructions, wherein the transceiver is configured to receive or send information as controlled by the processor, wherein the processor is configured to execute the instructions in the memory, wherein the bus system is configured to connect the memory, the transceiver, and the processor to allow communication among the memory, the transceiver, and the processor, wherein the processor is configured to call the instructions in the memory to implement operations of:

receiving a first authentication message sent by a first network equipment, the first authentication message comprising a first indication and a first extensible authentication protocol (EAP) message, the first indication indicating that the first EAP message is to be used by a second UE, the first EAP message being used to authenticate legality of use of a target network slice by the second UE; and sending the first EAP message to the second UE, wherein the second UE accesses the first network equipment through the first UE.

9. The first UE of claim 8, wherein the processor is further configured to call the instructions in the memory to implement an operation of:

before receiving the first authentication message sent by the first network equipment, sending an authentication request to the first network equipment, the authentication request being used to trigger an authentication flow for the second UE requesting to use the target network slice.

10. The first UE of claim 9, wherein the authentication request comprises at least one of: an identification (ID) of the second UE, single-network slice selection assistance information (S-NSSAI) corresponding to the target network slice, or a home public land mobile network (HPLMN) ID of the second UE.

11. The first UE of claim 8, wherein the processor is further configured to call the instructions in the memory to implement operations of:

receiving a second EAP message sent by the second UE, the second EAP message being used to authenticate legality of use of the target network slice by the second UE; and sending a second authentication message to the first network equipment, wherein the second authentication message comprises a second indication and the second EAP message, the second indication indicating association of the second EAP message with the second UE.

12. The first UE of claim 8, wherein the processor is further configured to call the instructions in the memory to implement operations of:

before receiving the first authentication message sent by the first network equipment, receiving an authentication command sent by the first network equipment, the authentication command comprising an EAP identification (ID) request and a third indication, the third indication indicating that the EAP ID request is to be used by the second UE; and sending the EAP ID request to the second UE.

13. The first UE of claim 12, wherein the processor is further configured to call the instructions in the memory to implement operations of:

after sending the EAP ID request to the second UE, receiving an EAP ID response sent by the second UE; and sending an authentication command response to the first network equipment, the authentication command response comprising a fourth indication and the EAP ID response, the fourth indication indicating association of the EAP ID response with the second UE.

14. The first UE of claim 8, wherein the processor is further configured to call the instructions in the memory to implement operations of:

after sending the first EAP message to the second UE, receiving a result of authentication sent by the first network equipment, the result of authentication comprising an authentication result for the target network slice requested by the second UE; and in response to that the result of authentication denotes success of authentication of the target network slice requested by the second UE, performing, for the second UE, relay on data in the target network slice.

15. The first UE of claim 8, wherein the processor is further configured to call the instructions in the memory to implement an operation of:

before receiving the first authentication message sent by the first network equipment, sending a discovery message, the discovery message comprising a home public land mobile network (HPLMN) identification (ID) of the first UE.

16. A second user equipment (UE), comprising a memory, a transceiver, a processor, and a bus system, wherein the memory is configured to store a program and an instruction, wherein the transceiver is configured to receive or send information as controlled by the processor, wherein the processor is configured to execute the program in the memory, wherein the bus system is configured to connect the memory, the transceiver, and the processor to allow communication among the memory, the transceiver, and the processor, wherein the processor is configured to call the instructions in the memory to implement an operation of:

receiving a first extensible authentication protocol (EAP) message sent by a first UE, the first EAP message being used to authenticate legality of a target network slice requested to be used by the second UE, the second UE accessing a first network equipment through the first UE.

17. The second UE of claim 16, wherein the processor is further configured to call the instructions in the memory to implement an operation of:

before receiving the first EAP message sent by a first UE, sending an authentication request, the authentication request being used to trigger an authentication flow for the second UE requesting to use the target network slice.

18. The second UE of claim 17, wherein sending the authentication request comprises:

sending the authentication request to the first UE through a port PC5; or sending the authentication request to a first authentication authorization accounting-server (AAA-S) through an application stratum, the first AAA-S being a home AAA-S of the second UE.

19. The second UE of claim 17, wherein the authentication request comprises at least one of:

an identification (ID) of the second UE, single-network slice selection assistance information (S-NSSAI) corresponding to the target network slice, or an HPLMN ID of the second UE.

20. The second UE of claim 16, wherein the processor is further configured to call the instructions in the memory to implement an operation of:

sending a second EAP message to the first UE, the second EAP message being used to authenticate legality of use of the target network slice by the second UE.

\* \* \* \* \*